U. PAVESI.
AXLE COUPLING FOR ROAD VEHICLES.
APPLICATION FILED JULY 19, 1917.
1,281,648.
Patented Oct. 15, 1918.
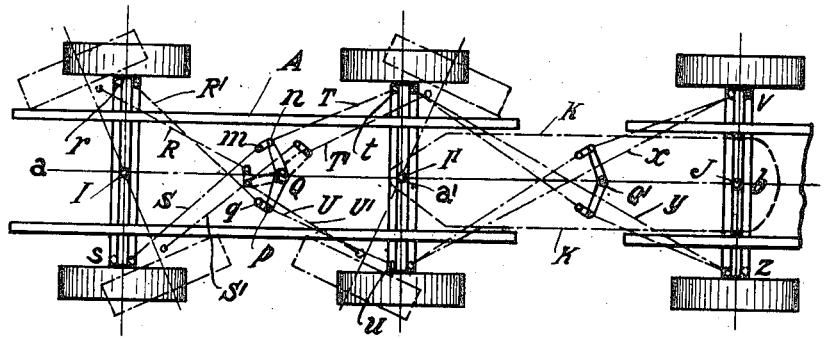
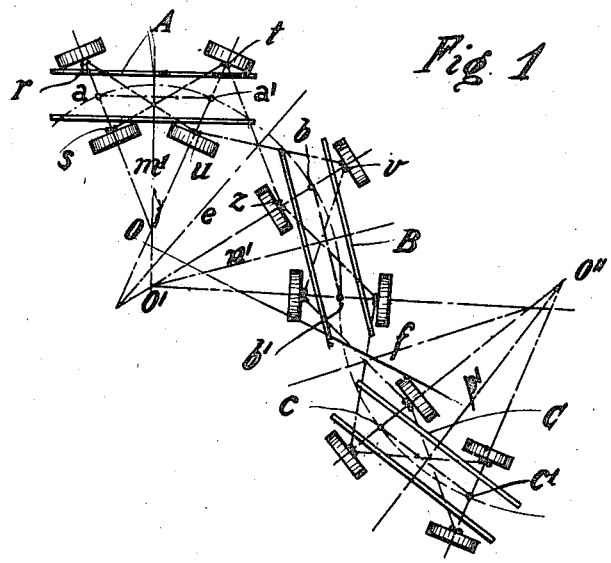
Inventor:
Ugo Pavesi
per H. W. Plucker
Attorney.

UNITED STATES PATENT OFFICE.

UGO PAVESI, OF MILAN, ITALY.

AXLE-COUPLING FOR ROAD-VEHICLES.

1,281,648.　　　　　　　Specification of Letters Patent.　　Patented Oct. 15, 1918.

Application filed July 19, 1917. Serial No. 181,559.

*To all whom it may concern:*

Be it known that I, UGO PAVESI, a subject of the King of Italy, resident of Milan, in the Kingdom of Italy, No. 18 Via Oglio, have invented new and useful Improvements in Axle-Couplings for Road-Vehicles, of which the following is a specification.

This invention relates to couplings or connections for coördinating the movements of vehicle axles when negotiating curves, and it is more particularly adapted for use on vehicles forming road trains.

It is an object of the invention to provide an improved arrangement for correcting the course of such vehicles in such a manner that successive axles will follow exactly the path through which the front axle of the first vehicle is led; the arrangement being applicable to any vehicle mounted upon one or more axles capable of turning upon a pivot fixed to the vehicle and situated at the middle of the axle.

A further object of the invention is to provide an arrangement of the kind referred to which will automatically compensate for such changes in the distance between diagonally opposite points on adjacent axles as are incident to the symmetrical turning of such axles about their central pivots.

In the accompanying drawing—

Figure 1 is a diagrammatic view illustrating the geometrical arrangement of the axles for attaining the said object.

Fig. 2 illustrates the practical application of the said arrangement to vehicles.

By reference to Fig. 1 it will be seen that in order to attain the first object above referred to the axes of the axles —$a$—, —$a'$— must pass through the point —$o$— situated on the straight line —$m'$—, brought perpendicularly over the middle point of the line which connects the pivots of the two axles —$a$—, —$a'$—, and which coincides with the longitudinal axis of the vehicle A. Likewise the axes of the axles —$b$—, —$b'$— and —$c$—, —$c'$— pass through the points —$o'$— and —$o''$— situated on the straight lines —$n'$— and —$p'$—, brought perpendicularly over the middle point of the lines which respectively connect the pivots of the axles —$b$—, —$b'$—, —$c$—, —$c'$—. That is to say, it is necessary that the two axles —$a$—, —$a'$— shall be displaced through the same angle with relation to their normal positions; the same is also necessary for —$b$—, —$b'$— and —$c$—, —$c'$—.

By reference to Fig. 1 it will also be seen that the axes of the axles —$a'$—, —$b$—, —$b'$—, —$c$— must be displaced to the same angle with relation to the perpendiculars brought over the middle of the lines —$a'$—$b$—, —$b'$—$c$—, etc., connecting the pivot of the rear axle of each vehicle with the pivot of the fore axle of the following vehicle.

Obviously, therefore, the result is that the distance —$r$—$u$—=—$s$—$t$—, the distance —$t$—$z$—=—$u$—$v$—, etc.

Reciprocally, if the said distances considered two by two remain equal to each other it may be inferred that all the other necessary and sufficient conditions for determining the correct direction of course also exist.

The characteristic feature of the arrangement forming the subject matter of the invention is that of maintaining equal to each other, in each position of the change of course, the distance $r$—$u$ and $t$—$s$ between the points $r$—$s$—$t$—$u$ symmetrical with relation to the pivots of the respective axles as well as maintaining equal to each other the distances $u$—$v$ and $t$—$z$, notwithstanding the changes in the lengths of these distances due to the deformation of the polygon —$r$—$s$—$t$—$u$—.

Fig. 2 illustrates a practical application of the invention. The four wheeled vehicle A has two axles —$a$—, —$a'$— each pivoting upon its central pivot —I—, —I'—. The points —$r$— and —$s$— of the axle —$a$— and the points —$t$— and —$u$— of the axle —$a'$— are connected together by a system of rods RSTU capable of assuming the position R' S' T' U'. These rods extend to an angle lever or equivalent device —$m$—, —$n$—, —$p$—, —$q$— which turns upon a pivot Q fixed to the vehicle; the object of this angle lever is continually to compensate for the variations in the lengths of the connections between —$r$— and —$u$— and between —$s$— and —$t$—, the said lengths decreasing during the change of course of the two axles.

It will be seen by the dotted lines how the arms —$m$—, —$n$— and —$p$—$q$— of the angle lever act as compensators.

The connection between one vehicle and the following vehicle can be effected by an identical system of rods with a second compensating angle lever applied at Q' which is a fixed pivot on the line —$a'$— —$b$— and may be supported on a coupling member —k—. —z— can be more simply connected with —t— and —u— with —v— by means of two rods —x— and —y—, since in this case the two axles belonging to two different vehicles, it is not necessary that the distance a'—, —b— shall remain absolutely constant.

Fig. 2 also shows that the invention is applicable to the traction of vehicles having only two wheels, in which case the hauled vehicle can be simply supported at —a'— at the end of the junction piece —k— and pivot on the axle —b— at J.

Another feature of a train composed of vehicles as hereinbefore described is its ability to travel in both directions.

The constructive details regarding the shape are, of course, capable of being varied without departing from the invention.

Having now particularly described and ascertained the nature of my said invention and in what manner the same is to be performed, I declare that what I claim is:—

1. An axle coupling for coördinating the movements of adjacent vehicle axles, comprising two pairs of rods respectively connected at their outer ends with diagonally opposite points on adjacent axles, and a compensating member pivoted on a point intermediate between said axles, the inner ends of said rods being connected with said compensating member, said member being adapted to absorb variations in the distances between the diagonally opposite points while keeping said distances equal to one another.

2. An axle coupling for coördinating the movements of adjacent vehicle axles, comprising two pairs of rods arranged crosswise and a compensating member pivoted on a point in proximity to the center of the cross, the outer ends of said rods being pivotally connected with diagonally opposite points on adjacent axles, and the inner ends of said rods being pivotally connected with said compensating member at points symmetrically arranged in pairs with respect to its pivot.

3. An axle coupling for coördinating the movements of adjacent vehicle axles, comprising two pairs of rods respectively connected at their outer ends with diagonally opposite points on adjacent axles, and an angle lever pivoted on a point intermediate between said axles, the inner ends of said rods being pivotally connected with said angle lever at points equidistant from its pivot.

4. An axle coupling for coördinating the movements of the front axle of one vehicle with those of the rear axle of another vehicle, comprising two pairs of rods respectively connected at their outer ends with diagonally opposite points on said axles, a coupling member pivotally connected to both vehicles, and an angle lever pivotally mounted on said member at a point on the line uniting the middle points of the two axles, the inner ends of said rods being pivotally connected with said angle lever at points equidistant from its pivot.

In testimony whereof I affix my signature this 15th day of June, 1917.

UGO PAVESI.